United States Patent [19]

Ketels

[11] Patent Number: 5,462,477
[45] Date of Patent: Oct. 31, 1995

[54] METHOD AND DEVICE FOR DEBONING LEG PIECES OF SLAUGHTERED ANIMALS

[75] Inventor: Gerardus H. J. Ketels, Grave, Netherlands

[73] Assignee: Stork Protecon B.V., Netherlands

[21] Appl. No.: 127,973

[22] Filed: Sep. 28, 1993

[30] Foreign Application Priority Data

Sep. 29, 1992 [NL] Netherlands ............................ 9201678
Mar. 30, 1993 [NL] Netherlands ............................ 9300564

[51] Int. Cl.⁶ .................................................. A22C 17/02
[52] U.S. Cl. ........................ 452/135; 452/136; 269/22
[58] Field of Search .............................. 452/135, 136; 269/22, 287, 75

[56] References Cited

U.S. PATENT DOCUMENTS

| | | |
|---|---|---|
| 1,435,877 | 11/1922 | Reubold . |
| 2,857,619 | 10/1958 | Massengill ............................ 452/136 |
| 3,210,801 | 10/1965 | Terranova ................................ 17/1 |
| 3,261,054 | 7/1966 | Kaplan et al. ........................... 17/11 |
| 3,456,284 | 7/1969 | Werner et al. ............................ 17/1 |
| 3,766,604 | 10/1973 | Lunn et al. ........................... 17/44.2 |
| 3,866,271 | 2/1975 | McNeil .................................... 17/1 |
| 4,446,600 | 5/1984 | Hooley et al. .......................... 17/11 |
| 5,030,163 | 7/1991 | Mielnik ................................. 452/136 |
| 5,067,927 | 11/1991 | Hazenbroek et al. ................. 452/135 |
| 5,090,759 | 2/1992 | Sato et al. .............................. 269/22 |
| 5,176,562 | 1/1993 | Martin et al. ......................... 452/136 |

FOREIGN PATENT DOCUMENTS

| | | | |
|---|---|---|---|
| 0049091 | 4/1982 | European Pat. Off. ........ A22C 17/04 |
| 0270513 | 6/1988 | European Pat. Off. ........ A22C 17/04 |
| 0278122 | 8/1988 | European Pat. Off. ........ A22C 17/04 |
| 1075457 | 10/1954 | France ........................................ 2/4 |
| 2428979 | 1/1980 | France ............................. A22C 5/00 |
| 203864 | 11/1983 | Germany ................................ 269/22 |
| 3735429 | 5/1988 | Germany ......................... B25J 15/00 |
| 6905373 | 10/1969 | Netherlands ................... A22C 17/04 |
| 8901582 | 1/1990 | Netherlands ................... A22C 17/00 |

OTHER PUBLICATIONS

Official Gazette, vol. 1115, No. 2, pp. 688–689, dated Jun. 12, 1990.

*Primary Examiner*—Willis Little
*Attorney, Agent, or Firm*—Webb Ziesenheim Bruening Logsdon Orkin & Hanson

[57] ABSTRACT

A method and device for deboning leg pieces of slaughtered animals such as turkeys, cattle, sheep, pigs other poultry and livestock, said method comprising the following steps:
   fixedly holding the leg piece at a bone end thereof,
   spatially orienting the holder and the leg piece fixedly held therein to obtain a suitable position for,
   exerting a force on the meat piece or portion thereof for removing the meat or meat portion in lengthwise direction of the leg piece, whereas said device for fixedly holding a meat piece comprises a carrier, which carrier carries a sleeve part enclosing the end portion of the leg piece, and wherein pressure means are arranged in the sleeve part for clamping the end portion of the meat piece, in order to position the leg piece in any desired position during processing steps of said method.

28 Claims, 6 Drawing Sheets

METHOD AND DEVICE FOR DEBONING LEG PIECES OF SLAUGHTERED ANIMALS

BACKGROUND OF THE INVENTION

The invention relates to a method for deboning leg pieces of slaughtered animals such as turkeys or cattle, sheep, pigs or other poultry or livestock.

Many proposals have already been made for deboning leg pieces, wherein use is made of mechanical means and wherein manual work is limited to a minimum. The problem that occurs here is that the meat piece is difficult to hold in place and position during the processing, for instance the removing of the meat from the bone. The problem occurring here is that the removing elements cannot properly follow the bone surface.

SUMMARY OF THE INVENTION

The invention has for its object to obviate the above stated drawback by providing a new method wherein the meat remains virtually intact.

The method according to the invention is distinguished by:

fixedly holding the leg piece at a bone end thereof, spatially orienting the holder and the leg piece fixedly held therein to obtain a suitable position for, exerting a force on the meat piece or portion thereof for removing the meat or meat portion in lengthwise direction of the leg piece.

Because according to the invention the leg piece only has to be held fast on one end and can be oriented spatially in all directions, the optimum position of the leg piece relative to the processing forces can be obtained, whereby the processing yield is increased without thereby damaging the meat. Moreover the leg piece may be transported between each of the processes carried out on said piece, by means of the holder.

It can herein be recommended to sever beforehand the sinews or tissue around the bone, for which purpose the invention proposes to perform a cutting operation close to the surface of the bone for pulling out prior to or during the applying of the pulling force to the bone or bone portion.

In order to reduce the tension on the meat round the bone or bone portions it can be recommended to arrange an incision in the skin located on the leg piece, which incision extends as far as the meat situated under the skin.

During the cutting and pulling movements the meat piece can be subjected to a rotation or swinging movement, which is enabled in simple manner due to the possibility of adjusting the meat piece in all directions.

The invention further relates to a device for fixedly holding the meat piece, wherein holding takes place on an end portion of the meat piece, which device is embodied with a carrier, which carrier carries a sleeve part enclosing the end portion of the leg piece, and wherein pressure means are arranged in the sleeve part for clamping the end portion of the meat piece.

The invention further relates to an annular device for breaking the adhesion between the meat and the bone, for instance clamped in a device as described above, which annular device is distinguished by an annular carrier and at least three stripping segments pivotable on a tangential shaft relative to this carrier, wherein each segment is embodied on the side remote from the pivot shaft with a supporting edge. The supporting edge of the segments supports on the surface of the bone piece so that the stripping elements can accurately follow the bone surface.

Each segment is preferably embodied with a cutting edge connecting onto the supporting edge for severing any sinews and tissues round the bone.

BRIEF DESCRIPTION OF THE DRAWINGS

The invention is further elucidated in the figure description hereinbelow of an embodiment of the method. In the accompanying drawing:

FIG. 6 is a perspective top view of an annular stripping member suitable for the method according to the invention, FIG. 7 shows an axial section of the annular stripping member of FIG. 6;

DETAILED DESCRIPTION OF THE PREFERRED EMBODIMENTS

Figure 1:
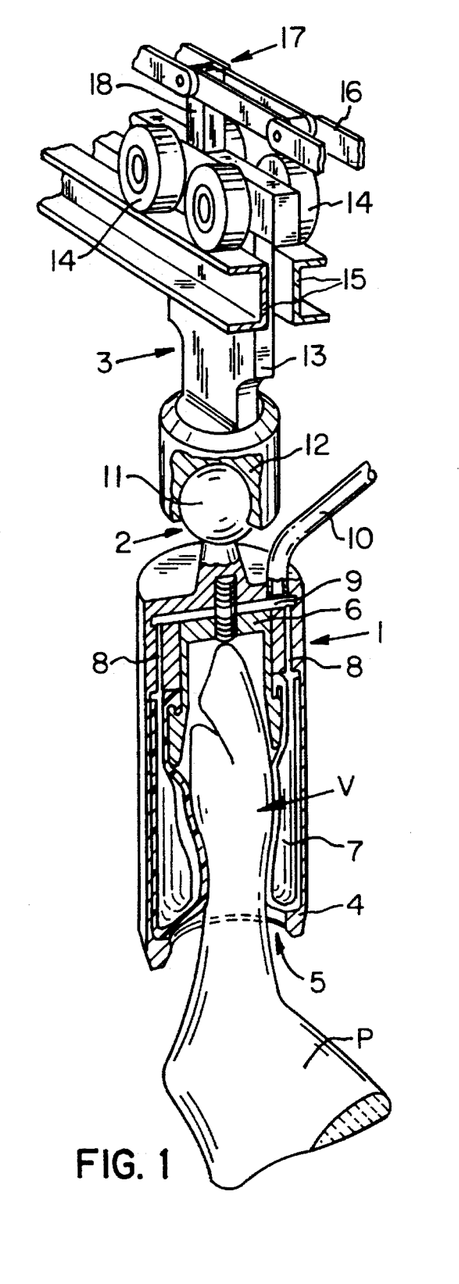
FIG. 1 shows a perspective view, partly in lengthwise section, of a clamping means for the foot portion of the leg piece of the slaughtered animal to be processed, FIG. 2, 3, 4 and 5 each show a step of the method with which bone portions are removed in longitudinal sense from the meat piece suspended in the clamp of FIG. 1.

The leg piece P, only the foot portion V of which is shown in FIG. 1, is clamped with the foot in the holding member 1 which is suspended via a ball joint 2 from a travelling carriage 3.

The holding member in the form of a clamp is here a cylindrical housing 4 with open underside, wherein a second cup-like cylindrical part 6 is fixed in the space of the housing close to the bottom thereof. The outer periphery of the cup-like part 6 is smaller than the inner periphery of the housing part 4 so that a space results therebetween for fixedly clamping an annular bellows 7 arranged in the space of housing part 4. This bellows can consist of more than one pressure chamber, this such that the most favourable clamping out he leg piece can take place. The clamping may also be asymmetrical and the space between the chambers can be provided with teeth against which the leg piece is fixedly pressed. The interior of the or each bellows chamber 7 communicates via connecting channels 8 situated between cup-like part 6 and housing part 4 with a common feed space 9 connected to a pressure supply line 10.

The ball joint 2 consists of a ball 11 which fits into a cup 12 of suitable material, this such that between ball 11 and cup 12 a sufficient friction is present to hold the clamping member 1 in a determined position in relation to the carriage 3.

The carriage 3 may be embodied in any suitable manner and consists here of a flat plate 13 which is provided at the top with two pairs of travel wheels 14. Travel wheels 14 are supported by two parallel U-shaped profiles 15 which form a travel rail which can assume all desired geometrical forms depending on the function and location in the slaughterhouse.

The movement of the carriage 3 relative to the travel rail can take place with a transporting chain 16 which is connected at 17 with a shackle to an upward pointing finger 18 of the carriage 3.

It is possible with the clamping device 1 of FIG. 1 to clamp the leg piece P on one side and, using the ball joint 2, to place the leg piece in any desired spatial position necessary to enable exerting of cutting and pulling movements on the bone portion in the leg piece.

A possible way of processing is further elucidated with reference to FIG. 2, 3, 4 and 5.

Figure 2:
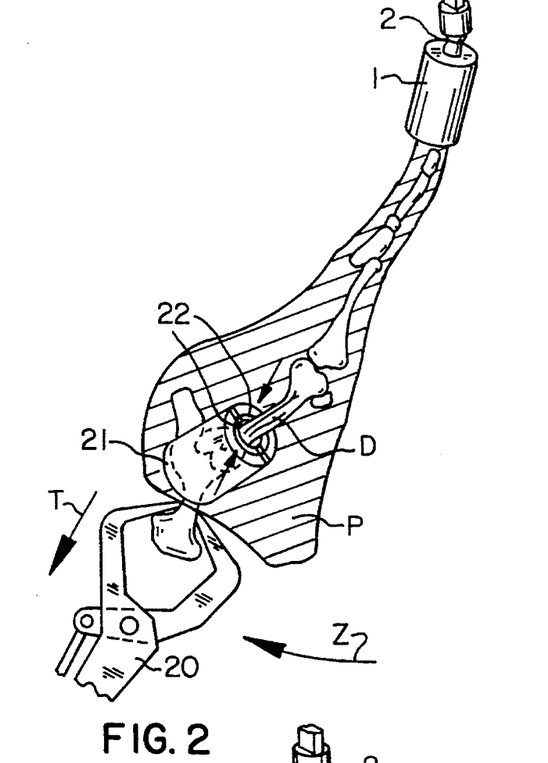

In FIG. 2 the leg piece is pivoted such that the shoulder blade (in forelegs) or the pelvic bone (in rear legs) is gripped by a clamping device 20. By exerting a pulling force by means of this clamping device 20 the shoulder blade or the pelvic bone can be removed.

During pulling loose the extremity of the thigh-bone in shoulder or hip joint is simultaneously localized and placed in a holder 21. Arranged around this holder are cutting elements 22 with which the adhesions of the sinews of the thigh muscles are severed.

Indicated in FIG. 2 with the arrow T is the pulling force applied to the shoulder blade or pelvic bone, while the pivoting movement of the leg piece P round the ball joint 2 is visualized with arrow Z.

Figure 3:
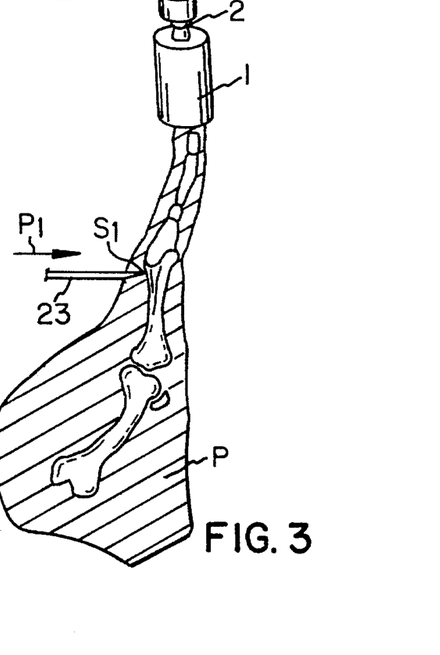

After this pre-processing the leg piece is once again suspended straight down and incisions are made in the leg piece round the foot joint close to the arrow P1 such that the sinews, namely the hamstrings, are severed, while the connecting ligaments of the bone ends however remain intact. This ensures that the bone piece consisting of two or more parts can be considered as one entity, whereby the total leg piece can still be fully controlled using the clamping on one side in clamping member 1.

The applying of the cut at the foot joint can take place with a transversely disposed knife 23, wherein the foot piece can be rotated round the vertical axis through ball joint 3 so that the cut can be arranged through the full 360° by means of the knife 23. It is also possible to cause the knife 23 to rotate round the suspended leg piece to obtain the same incision.

Figures 4, 6, 7:
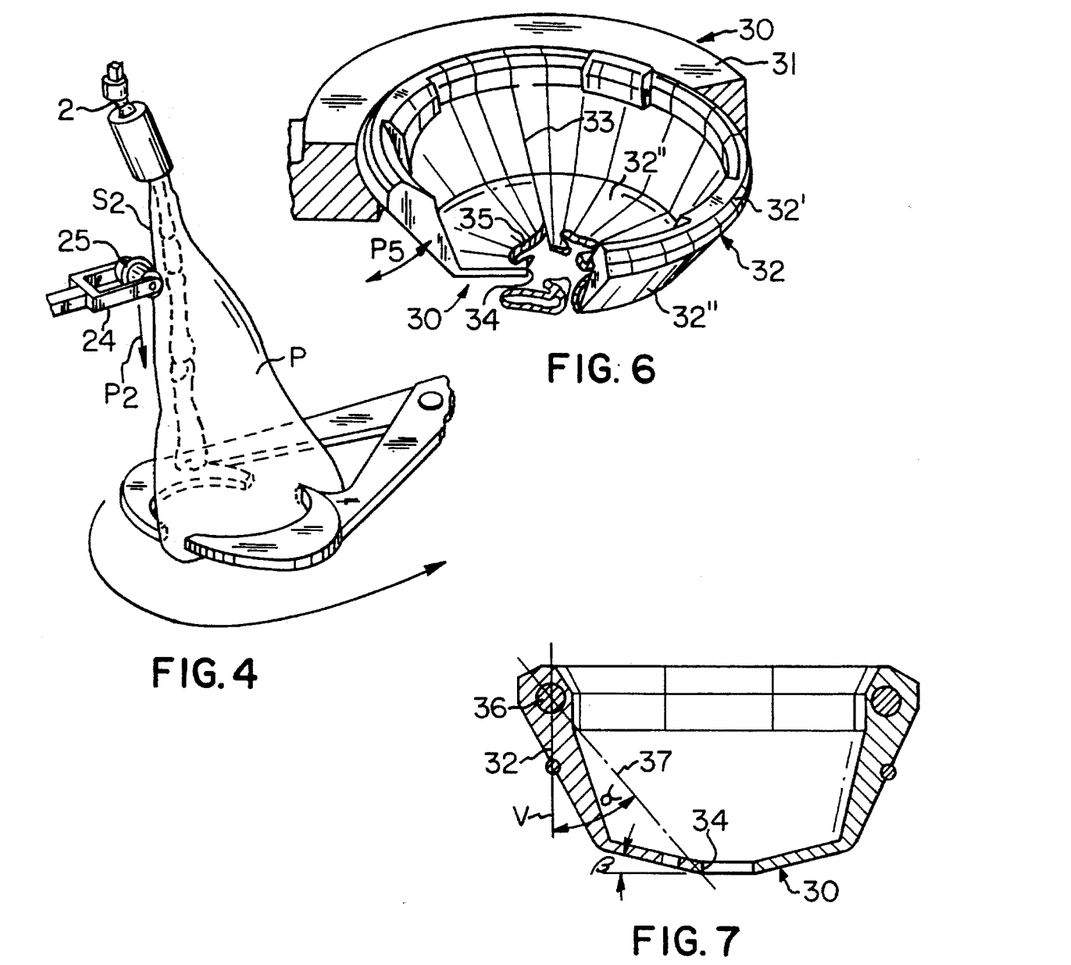

The leg piece can then be rotated and pivoted such that the most preferred side of the leg piece comes to hang vertically for applying of a vertically directed incision parallel to the bone piece, as shown in FIG. 4.

With a cutting member 24 in the form of a freely rotating disc-like knife 25 a shallow cut S2 is arranged in the direction of arrow P2, whereby the tension on the skin round the leg piece is removed. The incision S2 may not go deeper than the thickness of the skin with any connective tissue possibly lying beneath.

The leg piece P is here also placed spatially round the ball joint 2 such that the knife member 24, 25 can either be disposed along a fixed guiding, whereby the driving thereof is considerably simplified, or the knife can follow the surface of the leg piece P, wherein leg piece P can nevertheless be rotated into the correct position in the clamping suspension 2.

It is also possible to remove subcutaneous fatty tissue by means of friction by moving friction elements over the meat piece after the skin has been stripped from the meat piece helically or otherwise with or without cutting of shallow incisions beforehand.

Figure 5:
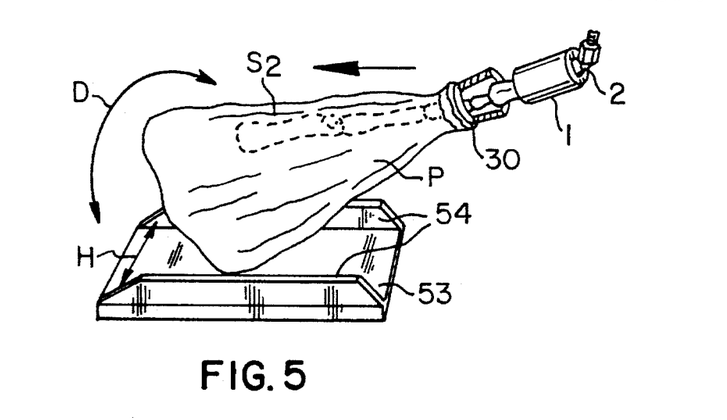

Finally, FIG. 5 shows that with an annular stripping member 30 which can be arranged round the bared bone of the foot joint the adhesion between muscle tissue and bone can be broken by sliding the ring 30 away from the clamp. The longitudinal incision S2 in the skin ensures that the meat can part adequately and thus remain tension-free.

During downward sliding of the annular stripping member 30 the product can remain freely suspended or free-lying so that anatomic separation takes place between the surrounding muscle tissue and the central bone portion consisting of the tibia and fibula with the shank. By giving the suspending construction a simultaneous reciprocal and rotating movement according to arrows H and D respectively sliding of the annular wall 30 along the bone piece is considerably simplified.

Depending on the size of the bone piece the sliding movement of the annular cutting member 30 can be continued and ended or interrupted for arranging of new incisions as according to arrow P1 in FIG. 3 in order to sever sinews, for instance at the knee joint. The shearing by means of the stripping member 30 can then be resumed until the meat is wholly released from the bone piece, wherein according to the invention the meat piece is wholly undamaged, which in the trade is called a "tunnel-boned ham" in the case of pigs, although with a shallow incision in the rind. The kneecap can be removed in known manner before or after this processing step.

Shown in FIG. 6 is an annular stripping member particularly suitable for the operation as described above with reference to FIG. 5.

The annular stripping member is obtained with four segments 32 hinged in an annular holder 31. These segments can pivot outward in the direction of the arrow P5 relative to the annular holder 31 and vice versa into the position of FIG. 6, wherein the longitudinal edges 33 fall against each other.

Each segment is provided with a supporting edge 34 and a specially formed cutting edge 35 which join the two side edges 33 of each segment. The supporting edge 34 comes into contact with the surface of the bone when the segments 32 lie in the position of FIG. 6. As the bone becomes thicker than the circle enclosed between the supporting edges 34 of the segments the latter will then be able to move apart due to the pivoting movement relative to the holder 31. Any sinews and flesh adhesion between the meat and bone are severed by the cutting edge 35.

It is noted that each segment consists of two parts, namely a part 31' connected to the ring 31 enclosing an acute top angle and a part 32" enclosing an obtuse conical angle with the other parts. During the movement along the bone this second segment part 32" lies in cutting position relative to the bone thereby facilitating removal of the meat from the bone. A stable situation of the segments moreover results during the shearing movement along the bone because the meat presses the segments toward each other such that they will tend to come to lie in the position of FIG. 6.

A spring element 30' can optionally be arranged round the segments, see FIG. 7.

FIG. 7 shows an axial longitudinal section of the stripping member of FIG. 6, wherein is shown that the connecting line 37 extending between the supporting edge 34 and the hinge 36 of each stripping member 32 encloses an angle α with the vertical V which lies between 15° and 60° and preferably has a value of 38°.

The stripping surface 38 on the underside of each segment encloses an angle β which here is approximately 15°.

Figure 8:
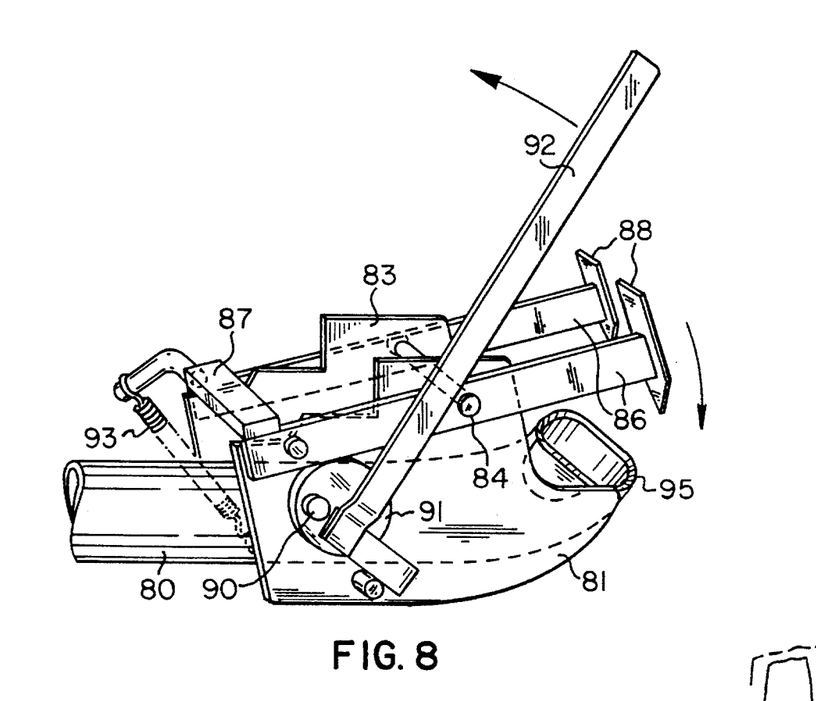
FIGS. 8 and 9 show perspective side views of an alternative embodiment of a clamping device for the bone portion, for instance pelvic bone, the furthest removed from the foot part.
Figure 9:
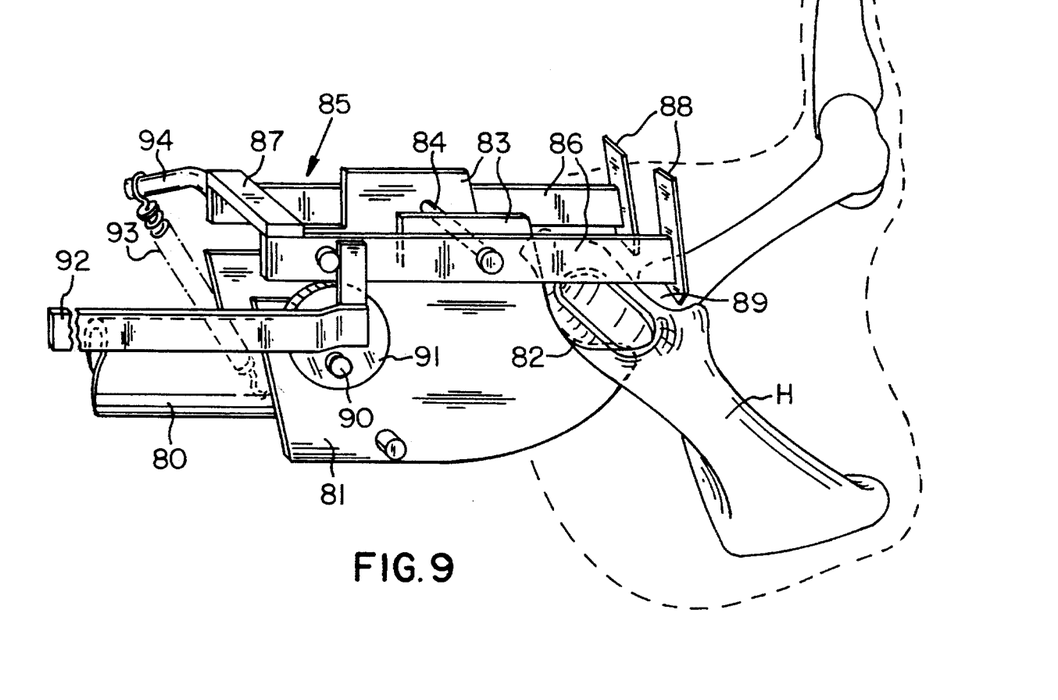

FIG. 8 and 9 each show a variant of the device 20 for clamping the bone portion, here the pelvis H, furthest from the foot part. The pelvis is connected in natural manner via sinews to the thigh-bone D of the meat piece.

The clamping device consists here of a carrier 80 in the form of a tubular member which can be fixed in random manner to a frame (not shown) and which for instance via a ball joint can assume any random spatial position in all directions. Carrier 80 is provided on both sides with two plate-like elements 81 which serve to grip the pelvic bone H in FIG. 9 with the side thereof remote from carrier 80. The edges of the plates 81 are consequently given a curved form at 82.

Each plate 81 is embodied on the top edge with an elevated portion 83 for receiving a pin 84 which serves as hinge pin for the other element 85, here consisting of two arms 86 which are mutually connected on the side facing carrier 80 by a bridge piece 87.

The free end of each arm 86 is embodied with a positioning element 88 in the form of a plate which is welded perpendicularly on the end of the arm. The positioning plate is provided with a tipped bottom end 89 which facilitates penetration into the meat and furthers accurate positioning of the edge of the thigh-bone. Moreover the positioning elements may be used for the guiding of a cutting element as depicted in FIG. 10 and 11 and further elucidated herebelow.

The plates 81 of the one element are also provided with an eccentric mechanism 91 in the form of a round plate arranged rotatably thereon at 90, the outer edge of which lies against the bottom edge of arms 86. The eccentric plate 91 can be rotated by a lever 92 which can be carried in random manner from the position of FIG. 8 to a position as in FIG. 9 and vice versa. This movement has the result that the arms 86 can be carried from an opened position according to FIG. 8 to a closed position as in FIG. 9 by means of a spring 93 which supports on one side on the plate 81 and on the other side on a lever 94 of bridge piece 87. Thus created is a holding or clamping device consisting of two elements 81, 85 which are movable toward and away from each other to fixedly clamp the pelvic bone H.

It is noted that in one embodiment the carrier 80 can be formed on the side facing the clamping side of plates 81 into a positioning element 95 which serves to be received in the natural orifice in the pelvic bone H. It will be apparent that the pelvic bone H can be firmly clamped by the clamping between the two elements 81, 85 and by the centering of the positioning edge 95 of carrier 80.

Figure 10:
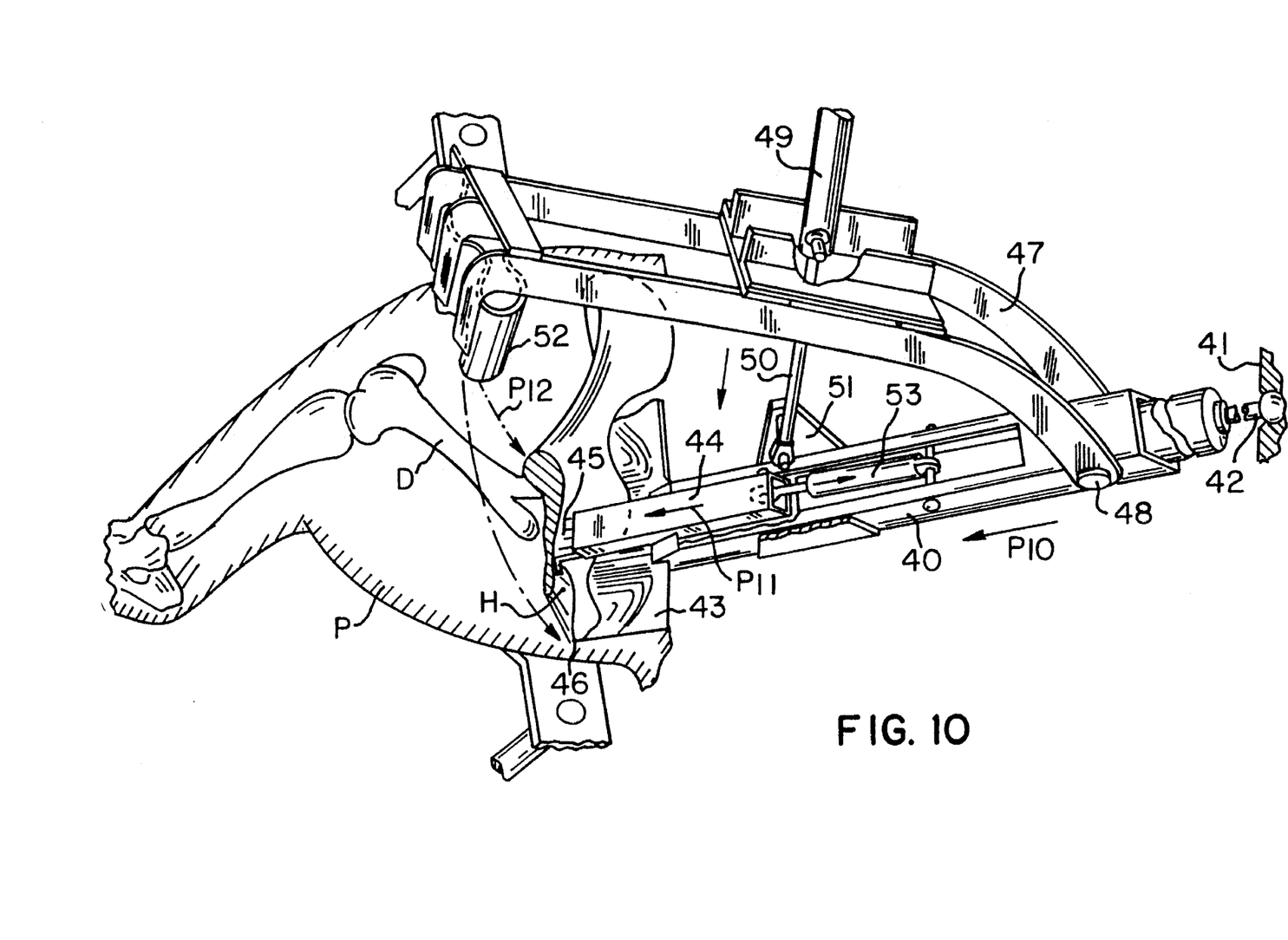
FIG. 10 shows a perspective top view of a device for removing the bone portion, in particular the hip-bone, the furthest removed from the clamp.
Figure 11:
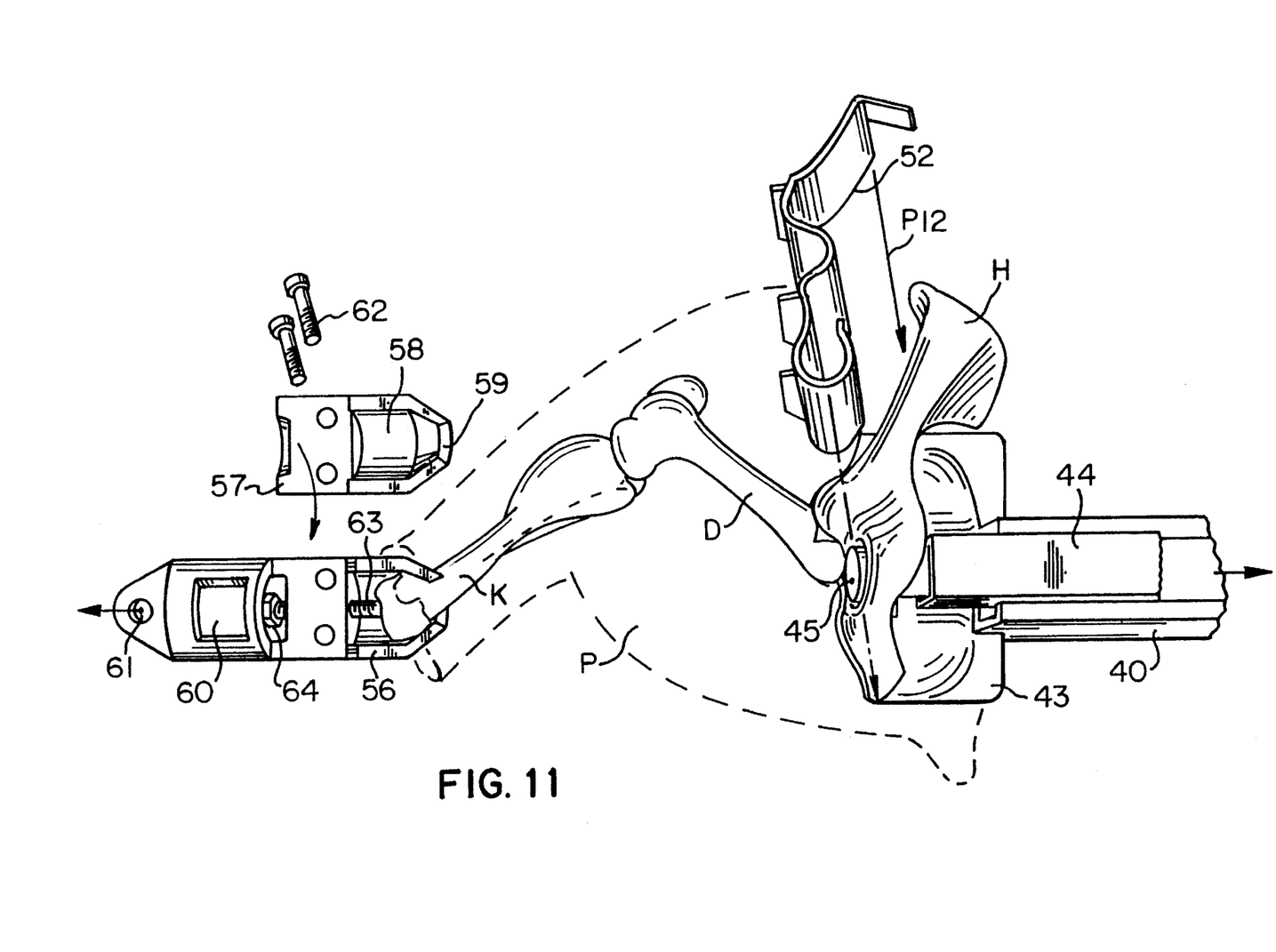
FIG. 11 shows a perspective top view corresponding with FIG. 10 with the device of FIG. 10 on enlarged scale in detail, in addition to a variant of the clamping means of FIG. 1.

FIG. 10 and 11 show a clamping device similar to FIG. 8 and 9 which also serves to strip or shear the flesh along the pelvic bone H in order to enable its removal therefrom.

The clamped meat piece P, here clamped at the leg end (not shown), is placed by the clamping means of FIG. 1 in the correct spatial position.

The device shown in FIG. 10 consists of a main carrier 40 which supports in random manner via a ball joint on a frame 41 (not further shown). The main carrier has on the end remote from the ball hinge 42 a plate-like element 43 which has a predetermined cross sectional profile adapted to the contours of the relevant pelvis.

Also arranged on main carrier 40 is a centering element 44 which is slidable relative to the main carrier 40. The free end of centering element 44 carries a positioning head 45 with a transverse pin 46 for limiting the sliding movement. The positioning head 45 serves for insertion into the naturally present hole in the pelvis H.

The main carrier 40 furthermore supports a pivot arm 47 with a determined curvature, which arm is hingedly connected at 48 to main carrier 40. A cylinder 49 is operational between arm 47 and main carrier 40, which cylinder 49 supports pivotally on the arm 47 and the piston rod 50 of which is connected pivotally at 51 to main carrier 40.

The end of the arm 47 likewise carries a profiled, plate-like element 52, the cross sectional profile shape of which is adapted to the pelvis H. It is noted that the surface of the plate-like element 43 and that of plate-like element 52 enclose a mutual angle of preferably 90°. The leg piece P can be supported on a table 53 which can if desired be provided with centering ridges.

The above described removing device operates as follows.

The meat piece P is placed in a determined spatial position and supports for instance on table 53, this between the ridges 54, wherein the leg end is clamped in the manner as shown in FIG. 1. During sliding in the direction of the clamp as according to arrow P10 the plate-like element 43 is pressed into the free end of meat piece P. Before the plate-like element 43 has reached the position of FIG. 10, the centering element 44 is shifted forward in the direction of arrow P11 relative to carrier 40 until the end piece 45 protrudes into the hole of the pelvis H. The movement according to arrow P10 continues further, wherein the centering element 44 is retracted relative to carrier 40. This can take place under the control of the cylinder 53 arranged between the centering element 44 and carrier 40. When plate-like element 43 has been moved in sufficiently underneath the pelvis H, the cylinder 49 can then be energized to carry the arm 47 from the position in FIG. 10 downward in the direction of plate-like element 43 as according to arrow P12.

As soon as plate-like element 52 has penetrated behind the pelvis H into the meat piece P, the movement according to arrow P12 can be halted and the whole device can be moved back in reverse direction of arrow P10, whereby a separation takes place between the thigh-bone D and the pelvis H. When the movement of the arm 47 in the direction of arrow P12 is resumed the edge of the plate-like element 52 can sever the sinews and tissues between both bone parts, wherein the movement according to arrow P12 continues until this relevant edge of the plate 52 comes to lie on the surface of plate 43. A complete separation of the pelvis H relative to meat piece P is hereby effected, and with a further withdrawing movement opposite to that of arrow P10 the whole pelvis H can be removed. Reference is also made here to FIG. 11, in which can be seen in detail that the positioning head 45 of the centering element 44 protrudes into the hole of the pelvis H, the pelvis H lies on the plate-like element 43 and the plate-like element 52 nestles in close-fitting manner behind the pelvis H during the downward movement according to arrow P12.

It is finally noted herein that the profile edge of both elements 43, 52 can have in addition to a cutting action also a scraping action on the bone surface, whereby the meat is scraped from the bone. A favourable scraping action is realized by moreover giving the edge a flexible form, for instance by making it from plastic material.

It is noted that in FIG. 11 is shown a variant of the clamping means for the leg end of the meat piece P.

The clamping means 55 is embodied here as a divided sleeve 56 and 57, the passage 58 of which narrows in the direction of the free end at 59.

The one part of the divided sleeve 56 is fixedly connected to a carrier 60 which can be connected in random manner via the eye 61 to the travel carriage 3 of FIG. 1 for pivoting in all directions.

The unattached sleeve part 57 can be fastened in any suitable manner to the fixed sleeve part 56, for instance by means of bolts 62.

It will be apparent that when the sleeve 55 is arranged on the bone portion, for instance the fibula part K of leg piece P, the thickened part of that bone portion K can be received in the passage 58, whereafter the other sleeve part 57 can be arranged by means of bolts 62. The bone portion K is hereby fully confined in this space 58.

In the bottom of the space in the sleeve a screw 63 is arranged as pressure means which can be rotated by means of the head 64. By rotating the screw 63 in the direction of the free end the thickened part of the fibula can be pressed firmly against the narrowed portion 59 of the sleeve, whereby a sturdy connection is effected. The screw can of course be substituted by any other suitable means.

Figure 12:
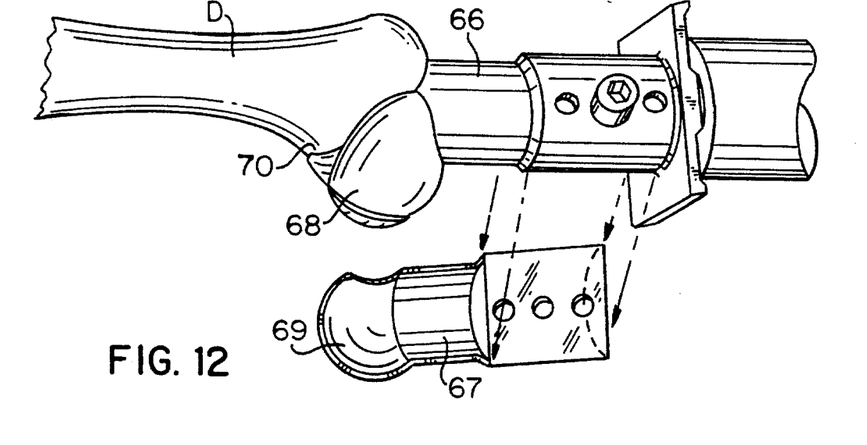
FIG. 12 is a perspective view of another clamping means for the thigh-bone.

FIG. 12 shows a variant of the clamping means of FIG. 9, with the understanding that the sleeve parts are here embodied differently. The fixed sleeve part and the removable sleeve part 66 respectively 67 have a bowl-shaped end 68, 69 which together form a space for receiving the ball joint 70 of thigh-bone D. After removal of the pelvis H the meat piece can thus be clamped on both sides whereby a better control of the leg piece or meat piece P for processing is realized.

Figure 13:
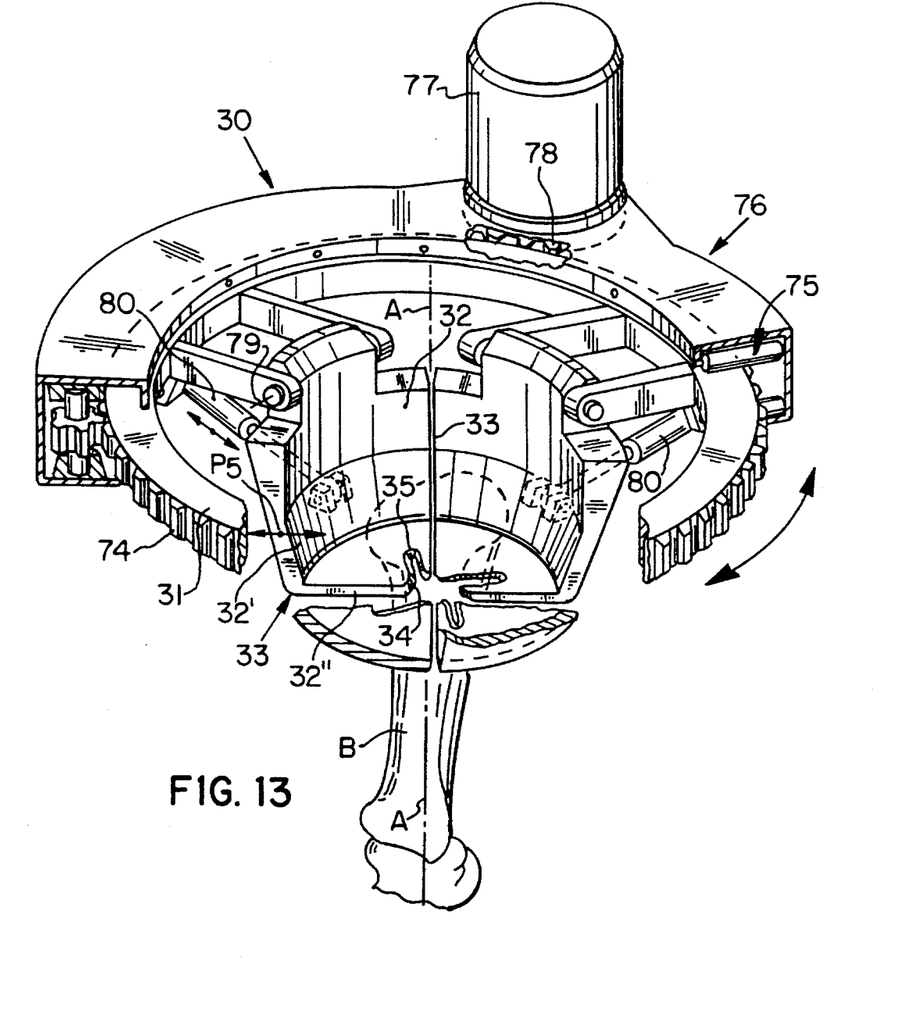
FIG. 13 is a perspective view of a variant of the annular stripping member of FIG. 6.

Referring to FIG. 13 in which a variant of the stripping member of FIG. 6 is shown, it is noted that the annular carrier 31 is here embodied as a gear rim with an outward pointing toothing 74. The ring is received by means of roller bearings 75 in an annular housing 76 having in cross section a substantially U-shaped profile. Housing 76 is coupled to the frame (not shown) of the processing station along the travel rail 15.

The housing 76 bears a motor housing 77, the output shaft of which is connected to a gear wheel 78 which is in engagement with the outer toothing 74.

The stripping segments 32 are, as stated above with reference to the description of FIG. 6, connected to the annular carrier 31 for pivoting on a tangential shaft 79. This makes it possible for the stripping elements 32 to pivot outward in the direction of the arrow P5. In contrast to the resilient resetting mechanism, a gas spring 80 or the like is arranged between each segment 32 and the ring 31 which ensures that the segments 32 are biased toward each other.

It is remarked that in this embodiment the second part 32' of each segment 32 lies practically perpendicular of the axis of rotation A—A of the segments, thus ensuring that with a sufficient length of each element 32' a more precise following of the bone surface can take place, also after a thickened portion of the bone serving as a joint has been passed over. No "dead" pieces therefore occur behind the thickened portions, so that little or no meat remains behind on the bone.

It is noted finally that by energizing the motor 77 the ring 31 is set into rotation, so that when the meat piece P is clamped a rotation of the elements 32 relative to the bone is obtained, which brings about a better stripping action. The invention is not limited to the above described embodiment.

I claim:

1. A device for fixedly holding a meat piece provided with a plurality of bone portions, wherein the bone portions lie substantially mutually in line, and wherein holding takes place on an end portion of the meat piece, comprising a carrier embodied with the holding device, which said carrier is provided with at least two elements closable toward and openable away from each other for gripping the bone portion contained in the meat wherein one element includes a first profiled member which is movable along one side of the relevant bone in the direction of the clamp and the other element is a second profiled counter member which can be carried in a movement substantially perpendicularly of the first member, and wherein an edge of at least one of the profiled members is embodied as a cutting edge and has a waved shape such that it connects onto the profiled surface of the other member.

2. The device as claimed in claim 1, wherein at least one element is provided with at least one positioning plate which protrudes over the other element in a closed position of the device.

3. The device as claimed in claim 1, wherein an edge of each profiled member takes a flexible form.

4. The device as claimed in claim 1, further comprising a centering means arranged actively between the elements.

5. A device for fixedly holding a meat piece provided with a plurality of bone portions, wherein the bone portions lie substantially mutually in line, and wherein holding takes place on an end portion of the meat piece, comprising a carrier embodied with the device, which said carrier carries a sleeve part enclosing the end portion of the leg piece, and pressure means arranged in the sleeve part for clamping the end portion of the meat piece, said holding device further including a device for breaking the adhesion between the meat and the bone having an annular carrier and at least three stripping segments pivotable on a tangential shaft relative to the carrier, wherein each segment is embodied on the side remote from the pivot shaft with a supporting edge.

6. The device as claimed in claim 5, wherein an inflatable collar is arranged as said pressure means.

7. The device as claimed in claim 6, wherein the inflatable collar is connected to a gas pressure source.

8. The device as claimed in claim 5, wherein the pressure means in the sleeve part has a pressure surface which can be pressed against the bone portion for clamping, wherein the passage of the sleeve narrows toward the free end thereof.

9. The device as claimed in claim 5, further including a cutting edge connected onto the supporting edge.

10. The device as claimed in claim 9, wherein the cutting edge is offset in relation to the supporting edge.

11. The device as claimed in claim 5, wherein each segment is driven for pivoting on the tangential shaft independently of the others.

12. The device as claimed in claim 5, wherein as seen in longitudinal section each segment has a bent or curved form.

13. The device as claimed in claim 12, wherein each segment further includes a first part which converges from a pivot axis to a rotation axis of the annular carrier and a second part with the stripping surface lying substantially perpendicularly of the rotation axis.

14. The device as claimed in claim 12, further including a connecting line between the supporting edge and the hinge of each segment which encloses an angle with the vertical of 15° to 60°.

15. The device as claimed in claim 5, wherein an angle of the stripping surface of each segment with the horizontal is an angle of 0° to 30°.

16. A device for fixedly holding a meat piece provided with a plurality of bone portions, wherein the bone portions lie substantially mutually in line, and wherein holding takes place on an end portion of the meat piece, comprising a carrier embodied with the holding device, which said carrier is provided with at least two elements closable toward and openable away from each other for gripping the bone portion contained in the meat, said holding device further including a device for breaking the adhesion between the meat and the bone having an annular carrier and at least three stripping segments pivotable on a tangential shaft relative to the annular carrier wherein each segment is embodied on the side remote from the pivot shaft with a supporting edge.

17. The device as claimed in claim 16, further including a cutting edge connected onto the supporting edge.

18. The device as claimed in claim 17, wherein the cutting edge is offset in relation to the supporting edge.

19. The device as claimed in claim 16, wherein each segment is driven for pivoting on the tangential shaft independently of the others.

20. The device as claimed in claim 16, wherein as seen in longitudinal section each segment has a bent or curved form.

21. The device as claimed in claim 20, wherein each segment further includes a first part which converges from a pivot axis to a rotation axis of the annular carrier and second part with the stripping surface lying substantially perpendicularly of the rotation axis.

22. The device as claimed in claim 20, further including a connecting line between the supporting edge and the hinge of each segment which encloses an angle with the vertical of 15° to 60°.

23. The device as claimed in claim 16, wherein an angle of the stripping surface of each segment with the horizontal is an angle of 0° to 30°.

24. The device as claimed in claim 16, wherein at least one element is provided with at least one positioning plate which protrudes over the other element in a closed position of the device.

25. The device as claimed in claim 16, wherein one element includes a first profiled member which is movable along one side of the relevant bone in the direction of the clamp and the other element is a second profiled counter member which can be carried in a movement substantially perpendicularly of the first member.

26. The device as claimed in claim 25, wherein an edge of at least one of the profiled members is embodied as a cutting edge and has a waved shape such that it connects onto the profiled surface of the other member.

27. The device as claimed in claim 25, wherein an edge of each profiled member takes a flexible form.

28. The device as claimed in claim 16, further comprising a centering means arranged actively between the elements.

\* \* \* \* \*